US010064527B2

(12) United States Patent
Mata

(10) Patent No.: US 10,064,527 B2
(45) Date of Patent: Sep. 4, 2018

(54) LEAF BLOWER VACUUM YARD CART

(71) Applicant: Jose Luis Mata, Chicago Heights, IL (US)

(72) Inventor: Jose Luis Mata, Chicago Heights, IL (US)

(73) Assignee: Jose L. Mata, Chicago Heights, IL (US)

( * ) Notice: Subject to any disclaimer, the term of this patent is extended or adjusted under 35 U.S.C. 154(b) by 37 days.

(21) Appl. No.: 15/285,747

(22) Filed: Oct. 5, 2016

(65) Prior Publication Data

US 2018/0092498 A1 Apr. 5, 2018

(51) Int. Cl.
| | |
|---|---|
| A47L 5/14 | (2006.01) |
| A01G 20/43 | (2018.01) |
| A01G 20/47 | (2018.01) |
| A47L 9/00 | (2006.01) |
| A47L 9/14 | (2006.01) |
| A47L 9/24 | (2006.01) |
| A47L 5/36 | (2006.01) |

(52) U.S. Cl.
CPC .............. *A47L 9/009* (2013.01); *A01G 20/43* (2018.02); *A01G 20/47* (2018.02); *A47L 5/14* (2013.01); *A47L 9/1409* (2013.01); *A47L 9/242* (2013.01); *A47L 5/36* (2013.01); *A47L 5/365* (2013.01); *A47L 9/0063* (2013.01); *A47L 9/1418* (2013.01)

(58) Field of Classification Search
CPC .......... A47L 9/009; A47L 9/1409; A47L 5/14; A47L 9/242; A47L 5/36; A47L 5/365; A47L 9/0063; A47L 9/1418; A01G 20/43; A01G 20/47

USPC ........................ 15/327.6, 345, 347, DIG. 8
See application file for complete search history.

(56) References Cited

U.S. PATENT DOCUMENTS

| | | | | |
|---|---|---|---|---|
| 4,723,893 A * | 2/1988 | Kiyooka | .................... | A47L 5/14 15/405 |
| 7,179,062 B1 * | 2/2007 | Drevitson | .............. | A47L 7/0085 15/345 |
| 2005/0193517 A1 * | 9/2005 | Svoboda | .................... | A47L 5/14 15/347 |
| 2005/0283942 A1 * | 12/2005 | Palazzolo | ................. | A47L 5/14 15/347 |
| 2007/0089262 A1 * | 4/2007 | Drevitson | ................. | A47L 5/14 15/339 |
| 2008/0295280 A1 * | 12/2008 | Goodger | ................ | A01G 1/125 15/347 |
| 2015/0135658 A1 * | 5/2015 | Laliberte | ................... | A47L 9/14 55/357 |

* cited by examiner

Primary Examiner — David Redding

(57) ABSTRACT

A leaf blower vacuum cart for mounting, transporting and utilizing an electric leaf vacuum blower and a standard 12"×16"×35" paper yard waste bag or similar. The invention is a two tiered cart with casters, a bottom shelf and a top shelf. The top shelf has an opening to accommodate a hopper which goes into a standard 12"×16"×35" paper yard waste bag or similar. The cart can be used with leaf blower vacuums of various makes. A hose is attached to the leaf blower vacuum allowing for extended reach of leaves. A second hose is connected to the exhaust of the leaf blower vacuum and to the hopper. The invention maximizes filling of standard 12"×16"×35" paper yard waste bags or similar. Full bags are moved on the cart to the desired location.

1 Claim, 7 Drawing Sheets

FIG. 8
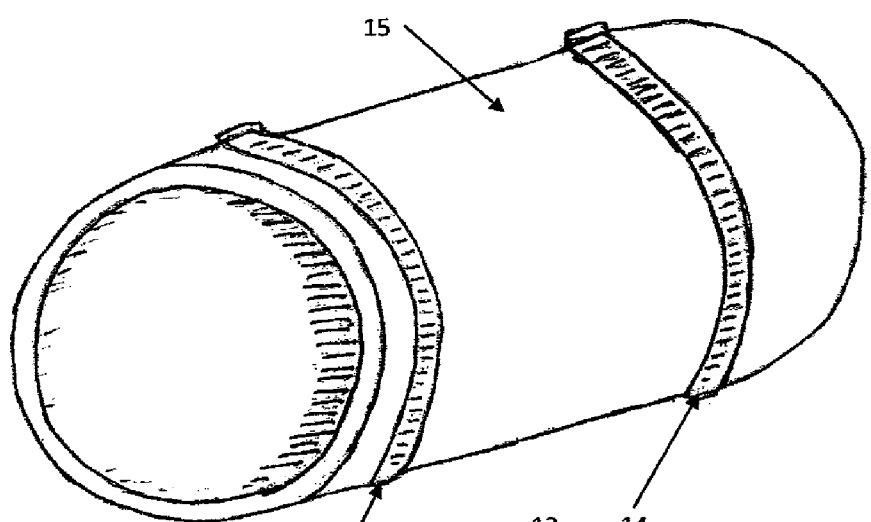
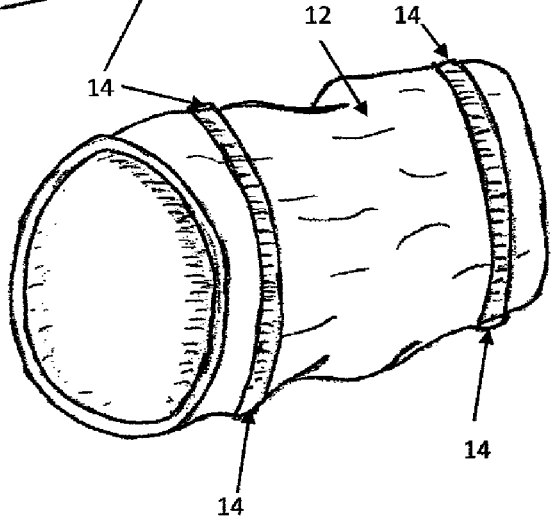
FIG. 9

LEAF BLOWER VACUUM YARD CART

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The invention generally relates to a mobile cart for use with a hand held leaf blower vacuum and particularly, to a cart that has components that enables the leaf blower vacuum to connect to a standard 12"×16"×35" paper yard waste bag or similar waste bag for collecting leaves and yard debris.

BRIEF SUMMARY OF THE INVENTION

The invention is a leaf and yard debris collection system. It has a bottom shelf and a top shelf. The top shelf has an opening to accommodate a hopper. A standard 12"×16"×35" paper yard waste bag or similar bag is held in place with a shock cord to the underside of the hopper. The cart accommodates and secures leaf blower vacuums of various makes. A hose is attached to the leaf blower vacuum intake. A second hose is attached to the exhaust of a leaf vacuum blower, with the other end of the hose connecting to the hopper. A fabric air regulator bag is fastened on top of the hopper.

It is an object of the invention to provide a leaf and yard debris collection and disposal system.

It is another object of the invention to make the leaf and debris collection a one step process.

It is another object of the invention to provide mobility to the operation of leaf and debris collection.

The features of the present invention will become evident upon reviewing the following specifications and drawings.

BRIEF DESCRIPTION OF SEVERAL VIEWS OF THE DRAWINGS

FIG. 5A is a view of the front and side view of the fabric air regulator bag.

FIG. 5B is a view of the back and side view of air regulator bag.

FIG. 6A is a view of the front and side of the hopper.

FIG. 6B is a view of the back and side view of the hopper.

FIG. 8 is view of the semi rigid coupler used to connect a flexible hose.

FIG. 9 is a view of the flexible coupler used to connect a flexible hose.

DETAILED DESCRIPTION OF THE INVENTION

Figure 1:
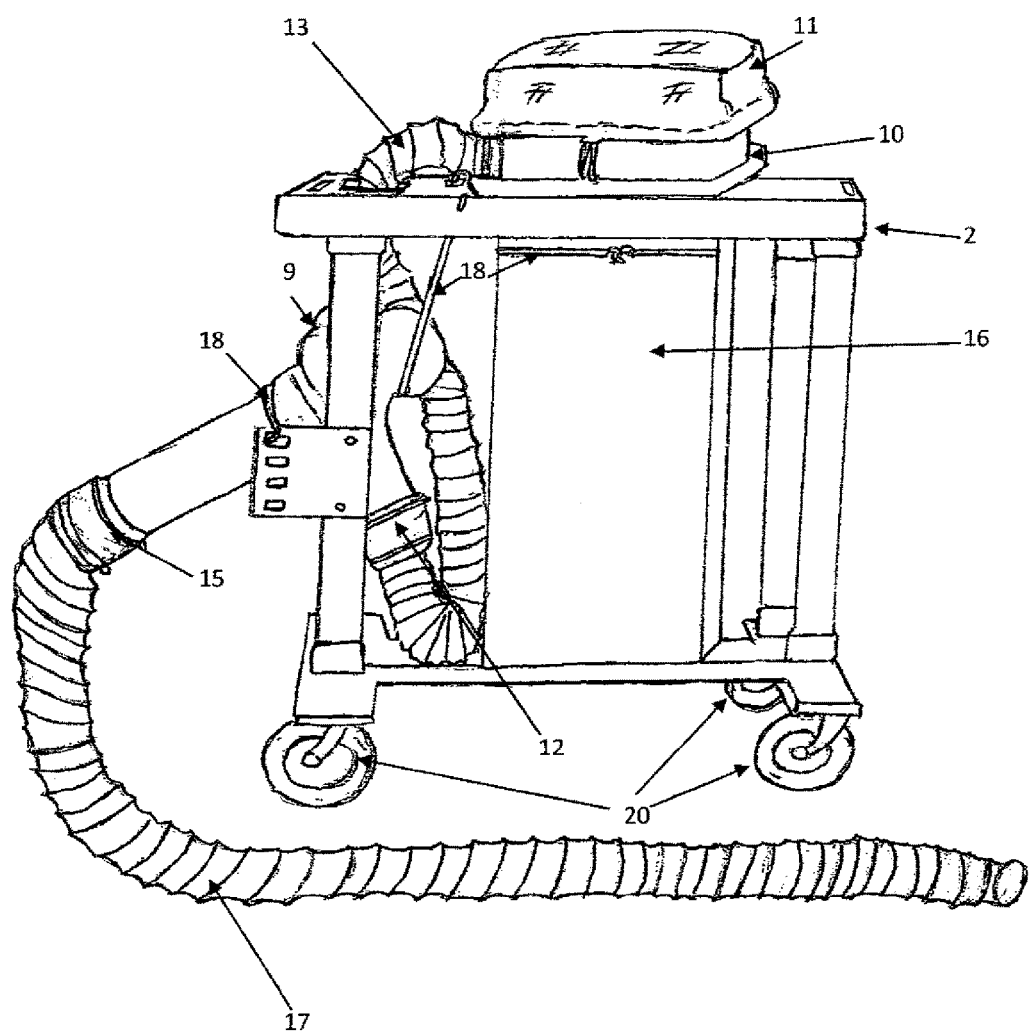
FIG. 1 is a view of the invention with its unique parts and readily available parts, the leaf blower vacuum, flexible hoses, shock cords and hose clamps.

This invention is best understood by reference to the drawings and in particular FIG. 1, a view of a leaf and yard waste collection system comprised of a two tiered cart 2 and readily available parts. A leaf blower vacuum 9 is attached to a flexible hose 17 which is connected to the intake of the leaf blower vacuum 9 with a semi rigid coupler 15, a flexible coupler 12 is attached to the exhaust port of the leaf blower vacuum 9. A flexible hose 13 connects to a flexible coupler 12, which then connects to a hopper 10 that sits on the cart 2, a standard 12"×16"×35" paper yard waste bag 16 or similar is held on to hopper 10 with a shock cord 18. A fabric air regulator bag 11 sits on the hopper 10. Cart 2 has casters 20.

Figure 2:
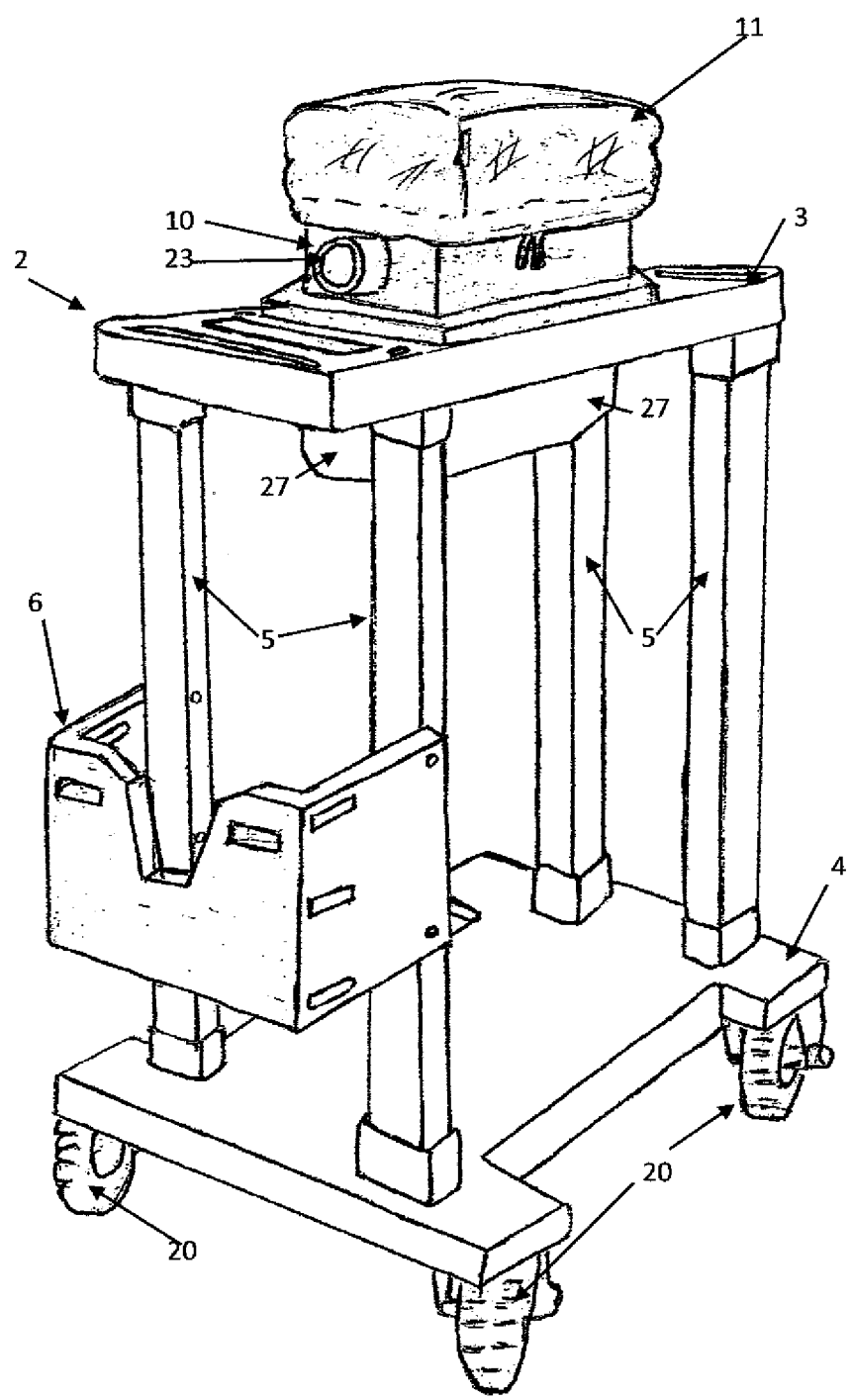
FIG. 2 is a view of the invention minus readily available parts.

FIG. 2 is a view of a cart 2 comprised of an upper shelf section 3, a lower shelf section 4, four rectangular upright supports 5, and a leaf blower vacuum support 6. The hopper 10 has tapers on its lower section 27, and an intake tube 23. The hopper 10 sits in an opening 8 in the shelf section 3 of the cart 2. The air regulator bag 11 is made of a flexible, air permeable fabric and is attached atop of the hopper 10 with a drawstring or similar.

Figure 3:
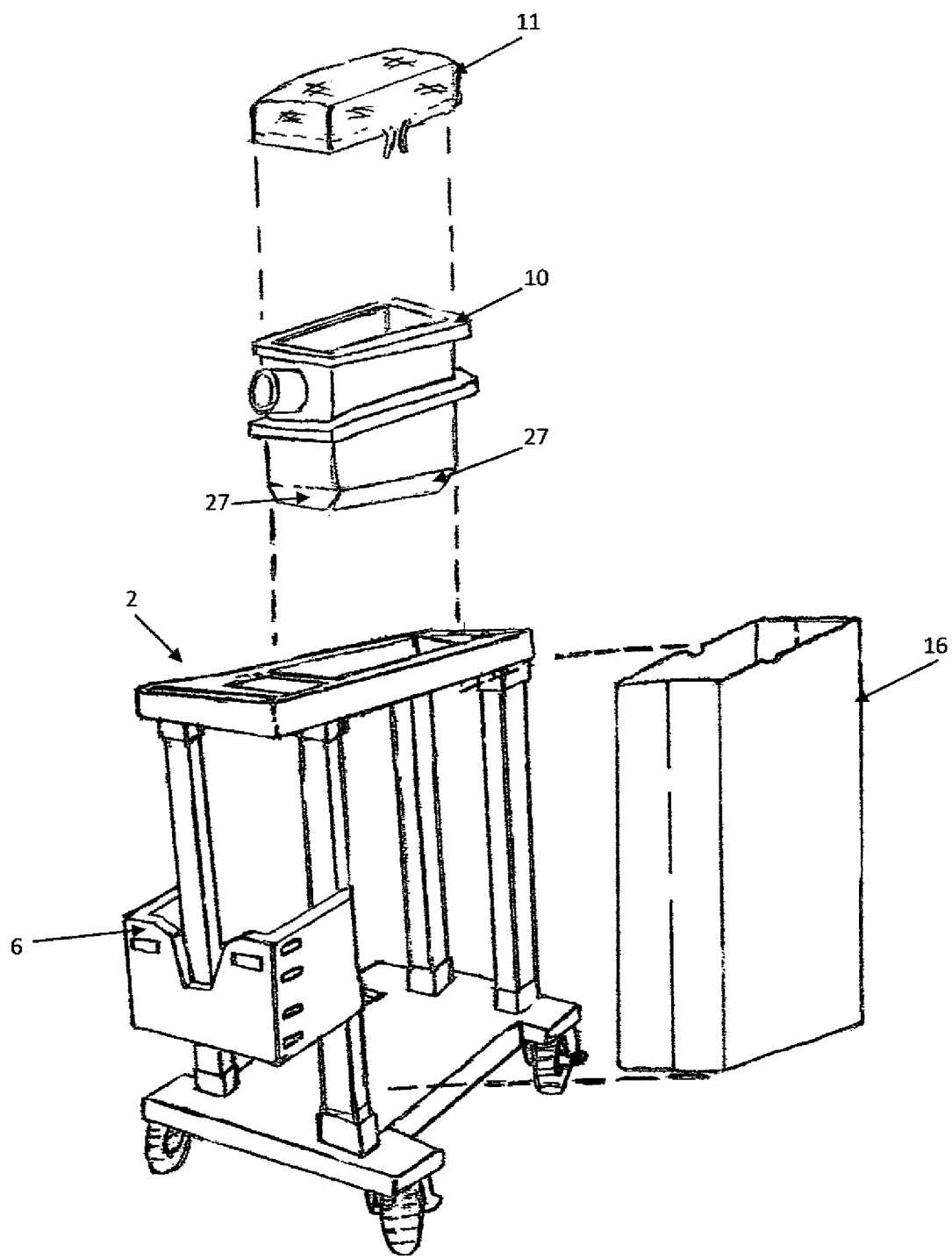
FIG. 3 is a view of the invention and a disposable paper yard bag with components shown floating with indicator lines to show alignment.

FIG. 3 is a view of the cart 2, the fabric air regulator bag 11, and the tapers 27 at the bottom of the hopper 10, the leaf blower vacuum support 6, and a standard 12"×16"×35" paper yard waste bag 16 or similar, with components shown floating with indicator lines to show alignment.

Figure 4:
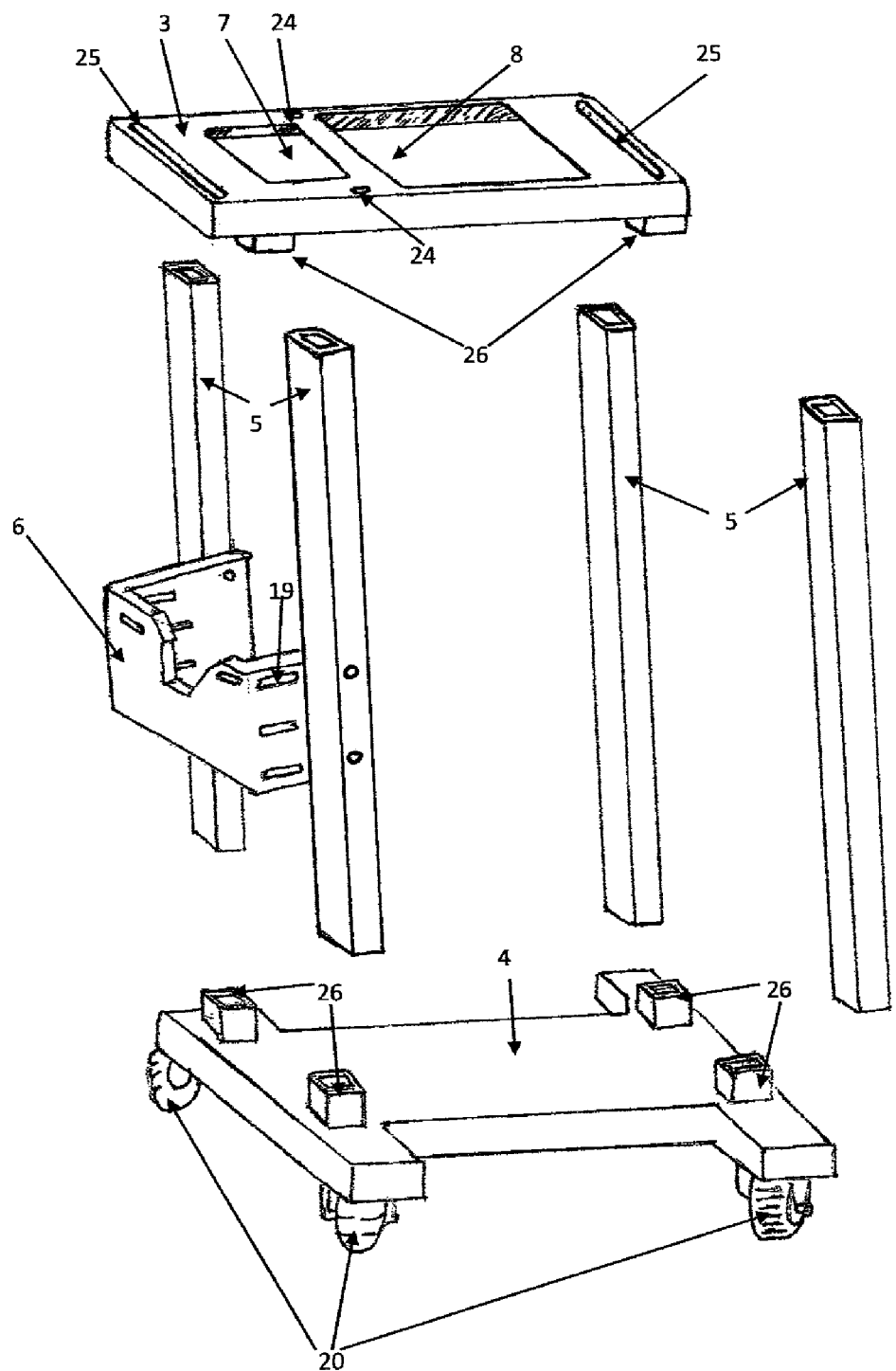
FIG. 4 is an exploded view of the cart.

FIG. 4 is an exploded view of the cart 2, the top shelf 3, the lower shelf 4, the four upright supports 5, the leaf vacuum blower support 6, an opening 7 in top shelf 3, opening 8 in top shelf 3 and openings 19 in leaf blower vacuum support 6 for shock cord attachments. Casters 20 are attached to the lower shelf 4 of the cart 2. Openings 24 in the top shelf 3 are for additional attachment of the leaf blower vacuum. The handle openings 25 on top shelf 3 are for manipulating the entire unit. Socket openings 26 for attaching four upright supports 5 to upper and lower shelf sections 3 and 4. The leaf blower vacuum support 6, is attached to two of the upright supports 5.

Figure 5:
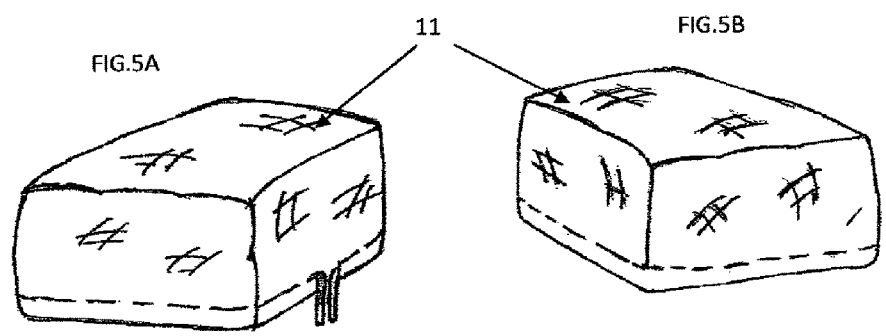
FIG. 5 is two views of the air fabric regulator bag of the invention.

FIG. 5 is two views of the fabric air regulator bag 11. FIG. 5A is the front and side view of the fabric air regulator bag 11 with the drawstring shown. FIG. 5B is the back and side view of the fabric air regulator bag 11 with drawstring not visible.

Figure 6:
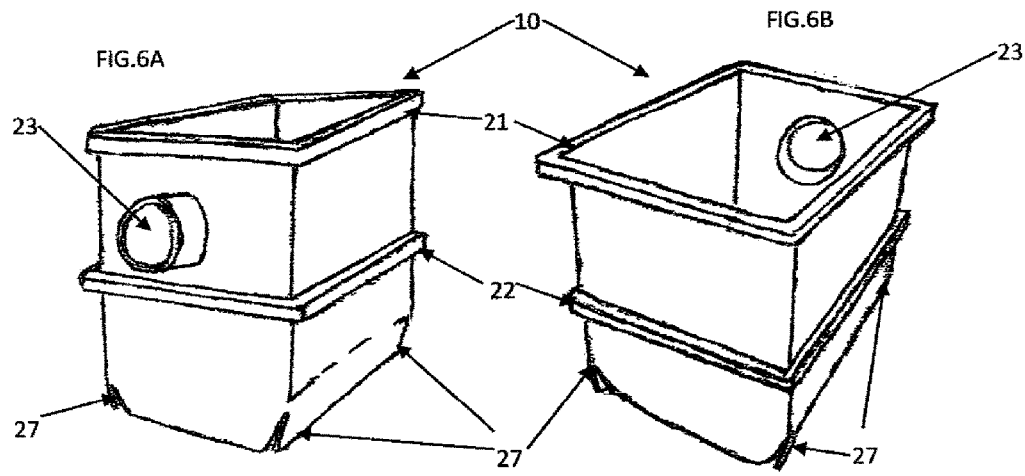
FIG. 6 is two views of the hopper of the invention.

FIG. 6 is two views of the hopper 10. FIG. 6A is the front and side view of the hopper 10 showing a top flange 21, a lower flange 22, showing a protruding view of the intake tube 23 and the tapers 27 at bottom of the hopper 10. FIG. 6B is the back and side view of the hopper 10, the top flange 21, the lower flange 22, the opening for intake tube 23, viewed from inside the hopper 10, and the tapers 27 at bottom of the hopper 10.

Figure 7:
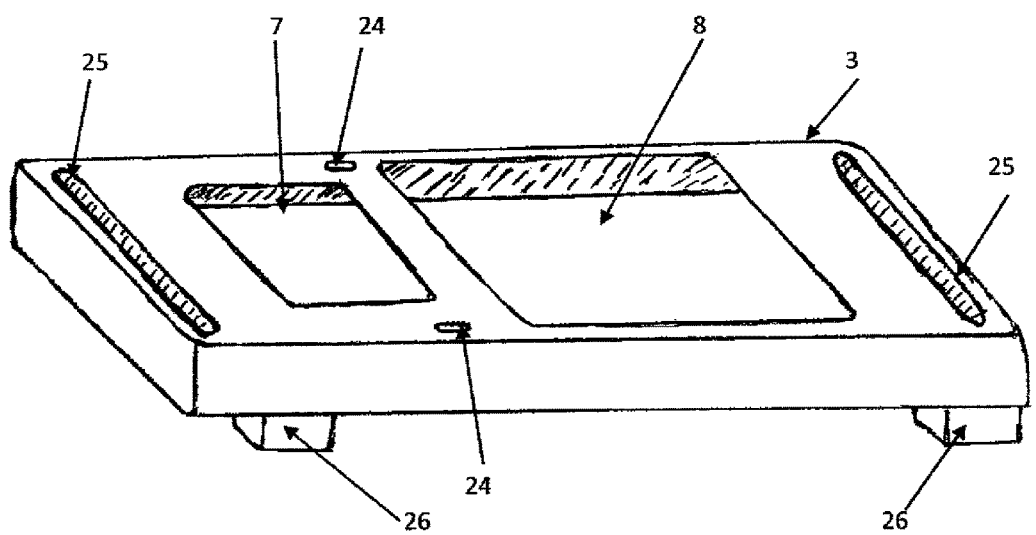
FIG. 7 is a view of the top shelf of the cart of the invention.

FIG. 7 is the view of the upper shelf 3 of the cart 2, opening 7 for the flexible hose 13 to pass through, an opening 8 holds hopper 10 in cart 2, openings 24 for attaching shock cords 18, handle openings 25, and socket openings 26 that accept upright supports.

FIG. 8 is a view of the semi rigid coupler 15 and two hose clamps 14.

FIG. 9 is a view of the flexible coupler 12 and two hose clamps 14.

Operations—FIGS. 1,2,3,4,5A,5B,6A,6B,7,8,9

The object of the invention is to collect leaves and other similar sized yard debris using a leaf blower vacuum in the suction mode and to deposit the debris in a final container in one step. As shown in FIG. 1 the leaf blower vacuum is attached to the cart 2, with a shock cord to a support assembly 6 shown in FIG. 2. There are openings 24 in the upper shelf section 3 of the cart that are used to secure the leaf blower vacuum with shock cords as shown in FIG. 4. Also shown in FIG. 1 is a flexible hose 17, which is attached to the intake tube of the leaf blower vacuum with a semi rigid coupler 15 shown in FIG. 8 with hose clamps. A flexible hose 13 is attached to the exhaust of the leaf blower vacuum with a flexible coupler 12 shown in FIG. 9 with hose clamps. The hose 13 is attached to the hopper 10, which has an intake tube 23, shown in FIG. 6, to accept the hose 13 coming from the leaf blower vacuum exhaust.

When the leaf blower vacuum is turned on leaves are drawn in through the hose 17, shredded and exhausted through the hose 13 to the hopper 10. The leaves fall into a standard 12"×16"×35" paper yard waste bag 16 or similar. The bag is attached to the bottom of the hopper 10 with a shock cord 18.

A fabric air regulator bag 11 is attached to the top of the hopper 10 with a draw string. The draw string is tightened below a flange 21 that runs around the top of the hopper 10. The hopper 10 has a second flange 22 around its midsection that prevents the hopper 10 from falling through opening 8 in the top shelf section 3 of the cart. The hopper with its flanges are detailed in FIG. 6A and FIG. 6B. The fabric air regulator bag 11 shown in FIG. 5A and FIG. 5B is constructed to let air pass through it, but not so much as would affect the ability of the vacuum to successfully draw leaves and debris from the end of the hose 17 to the hopper 10 and to the standard 12"×16"×35" paper yard waste bag 16 or similar. As the yard bag 16 is filled it will expand in all directions. The standard 12"×16"×35" disposable paper yard waste bag 16 slides over the lower end of the hopper which is rectangular in general shape. The standard 12"×16"×35" paper yard waste bag slides onto the hopper easily due to tapers at the hoppers lowest edges. After passing the tapered sections the standard 12"×16"×35" paper yard waste bag is slid to a position where the bag fits snugly. A shock cord is then used to attach the bag to the hopper.

A person can pull the entire unit shown in FIG. 1 by the flexible hose 17 easily while collecting leaves and yard debris. The cart can also be pulled by the upper shelf section 3 by the handle openings 25 shown in FIG. 7.

I claim:

1. A leaf blower vacuum cart for transportation and utilization of a leaf blower vacuum and a standard 12"×16"×35" paper yard waste bag comprising:
    a. an upper and lower shelf joined at the corners with a plurality of elongated support members of a predetermined length,
    b. a support member attached to a plurality of said elongated supports for attaching a leaf blower vacuum to said cart with a shock cord,
    c. a plurality of casters attached to the underside of said lower shelf of said cart,
    d. a flexible hose for attaching to the intake of a leaf blower vacuum with a coupler,
    e. a second flexible hose for attaching to the output of a leaf blower vacuum with a coupler and to a hopper that sits in an opening in said upper shelf of said cart,
    f. a standard 12"×16"×35" paper yard waste bag attached to the underside of said hopper with a second shock cord,
    g. an air regulator bag attached to the top of said hopper with a drawstring,
    whereby the combination and arrangement of elements provide air regulation and mobility for the efficient operation of leaf and lawn debris collection into a paper yard bag in one step.

* * * * *